G. R. VON KROGOLL.
FRY CAKE AND DOUGHNUT COOKER.
APPLICATION FILED OCT. 12, 1908.
1,025,630.
Patented May 7, 1912.
2 SHEETS—SHEET 2.
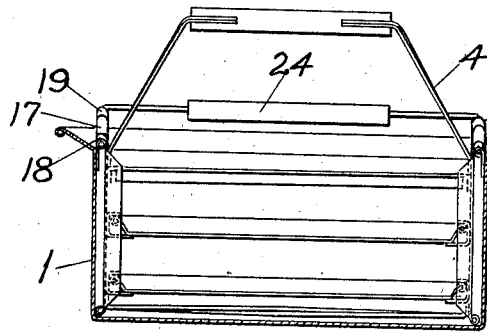
Fig 7
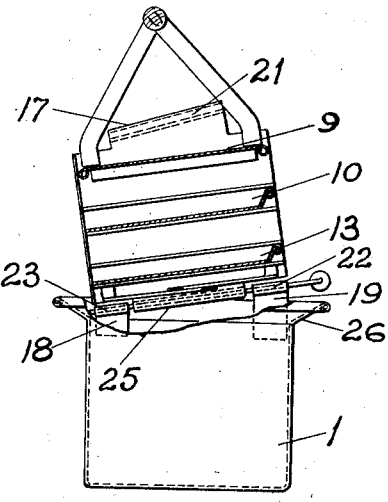
Fig 8
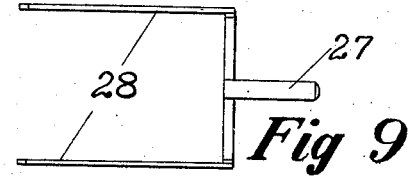
Fig 9
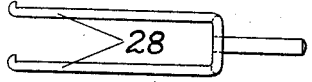
Fig 10
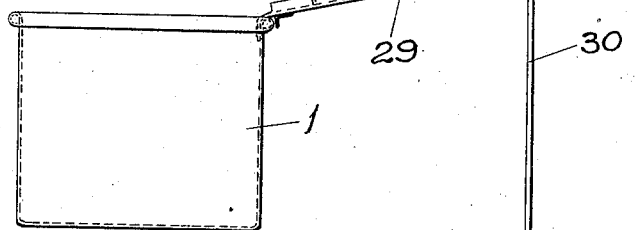
Fig 11
Witnesses:
Olof Johnson
H. E. Talbot
Inventor:
Gustav Rudolf von Krogoll
By Paul Talbot
His Attorney ated May 7, 1912.

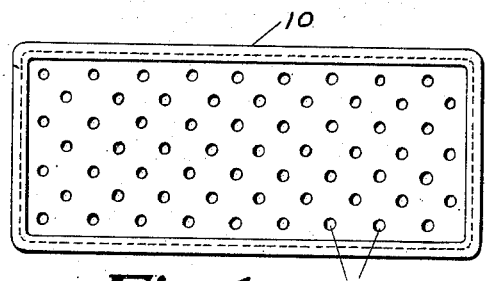
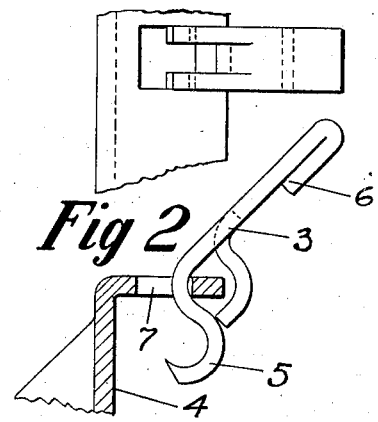
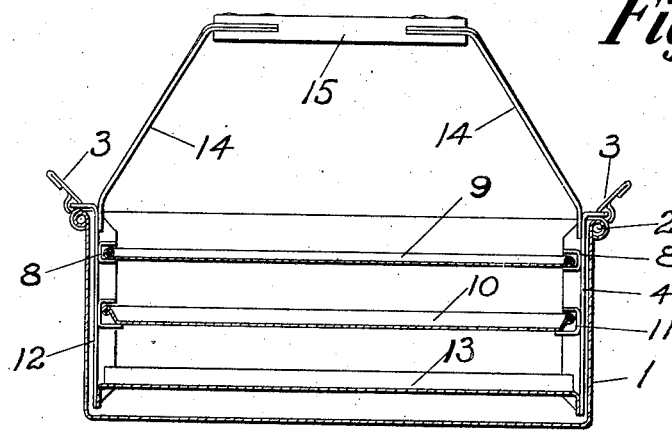
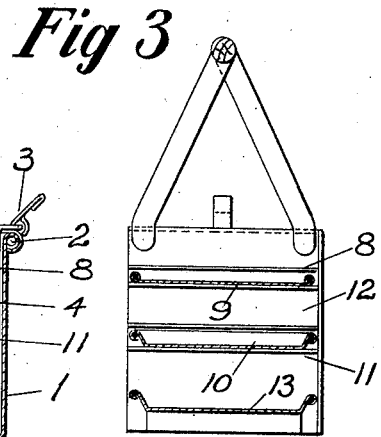

UNITED STATES PATENT OFFICE.

GUSTAV RUDOLF von KROGOLL, OF SEATTLE, WASHINGTON.

FRY-CAKE AND DOUGHNUT COOKER.

1,025,630.

Specification of Letters Patent.   Patented May 7, 1912.

Application filed October 12, 1908. Serial No. 457,440.

*To all whom it may concern:*

Be it known that I, GUSTAV RUDOLF VON KROGOLL, a citizen of the United States, residing at Seattle, in the county of King and State of Washington, have invented a new and useful Fry-Cake and Doughnut Cooker, of which the following is a clear and concise specification.

My invention relates to a fry cake and doughnut cooker in which doughnuts and other cakes cooked in a similar manner are submerged during the process of cooking and are fried on trays forming a part of my invention as hereinafter more fully set forth.

The objects of my invention are to provide a rack or framework having a plurality of trays detachably held in fixed relation thereto to receive the dough to be cooked thus preventing the handling of the cakes after being formed; to provide a means whereby doughnuts or similar cakes are held beneath the surface of the fat used in the frying thereof; to provide a dough supporting framework detachably held in fixed relation to a like shape kettle thus preventing said frame work from being raised by the cakes in cooking; to provide a device for frying doughnuts which will not mark said doughnuts and which may be combined with the kettle to facilitate a continuous operation thereof and means for draining the grease.

I accomplish these as well as minor objects by the construction now preferred by me and illustrated by the accompanying drawing in which—

Figure 1 is a plan view of one of the trays of my device; Figs. 2 and 3 are detailed views of the rack retaining catch of my device; Fig. 4 is a section and elevation of my device showing one of the racks in place; Fig. 5 is a transverse section of the rack with the trays in place; Fig. 6 is a section showing the construction of a form of tray; Fig. 7 is a section and elevation of the preferred form of my device; Fig. 8 is an end elevation; Figs. 9 and 10 are detailed views of the shelf lifting device and Fig. 11 is an end elevation and partial section of a modification of the drain tray of my device.

Similar reference numerals refer to similar parts throughout the several views of my device as illustrated in the accompanying drawings.

My invention consists of a kettle 1 preferably rectangular in shape having a suitable reinforcement at the upper edge thereof disposed on the outside of said kettle and adapted to receive the rack retaining catches 3 which are preferably hingedly secured to the rack 4 and are provided with a hook 5 and a handle 6 disposed to hold said hook in or out of engagement by gravity, said rack 4 is provided with a flanged extension 7 adapted to rest on the upper surface of said kettle 1 thereby supporting said rack in fixed relation with the said kettle and is prevented from rising, due to the buoyancy of the doughnuts or cakes cooking; by said catches 3 which engage said reinforcement 2, said rack is preferably provided with channel shelf receiving members 8 adapted to receive the upper shelf 9, the middle shelf 10 being supported by the retaining members 11, both of said retaining members 8 and 11 being rigidly secured to the end walls 12 of said rack 4. I have also provided a lower shelf 13 which is supported by end walls 12 thus connecting and holding said walls in fixed relation to each other at the lower portion of the rack, the upper portion being held by the straps 14 which form a part of the handle 15 which is preferably made of wood or other heat insulating material. Each of said shelves 9, 10 and 13 are preferably provided with perforations 16 which permit the heated fat contained in said kettle 1 to rise and cook the cakes and doughnuts held submerged between the shelves 9 and 10 and 13.

In Figs. 7 and 8 I have shown the rack 4 as being provided with an upper fastening piece 17 adapted to co-act with the members 18 and 19 which are secured to the upper edge of said kettle 1 to hold said rack in position and having the securing rod 20 adapted to detachably fit the apertures 21—22 and 23 provided in said members, and in said upper fastening piece, said securing rod is preferably provided with a wooden handle 24 to prevent the user from being burned by the heated fat in said kettle. I have provided a lower fastening piece 25 disposed to incline said rack when in the raised position to facilitate the fat to drain from the doughnuts contained in the shelves 10 and 13. By the construction just described the shelves 10 and 13 are removed and the rack remains held in the raised position. To prevent the fat from said rack and shelves from dripping on to the range I have provided a flanged projection 26 secured to the upper edge of said kettle 1.

In Figs. 9 and 10 I have shown a shelf removing device comprised of a heat insulated handle 27 rigidly secured to the supporting members 28 which are preferably four in number and are adapted to engage the under surface of said shelves 10 and 13 and may be used as a rack while filling as well as to remove said shelves while hot from the boiling fat in which the cakes are cooked.

In Fig. 11 I have shown a modification of my device in which I have provided a drain tray 29 which is supported by the edge of said kettle 1 and the legs 30 and is adapted to hold said rack 4 and shelves therein in an inclined position to permit the fat therefrom to drain in said kettle.

The operation of my device is substantially as follows: The kettle is nearly filled with fat and placed on the fire and heated to the required temperature. One of said racks 4 is filled with doughnuts which are placed from the maker's hands on to the shelf 13 which saves transferring the dough from a tray to the kettle, the operation now common in practice. After the shelf 13 has been filled with the cakes the shelf 10 is placed into position being slidably mounted and inserted from the side into said rack 4 and is filled with cakes. When the shelves 10 and 13 are filled the shelf 9 is placed into position also sliding from the side into said rack 4 which is carried from the maker's bench to the range on which the kettle is heated; the shelf 9 being disposed substantially under the upper surface of the fat thus totally submerging the cakes on the shelves 10 and 13. While said cakes are being cooked a duplicate rack and trays are filled in the manner just described thus making a continuous operation of the kettle as the newly filled racks are placed in the kettle after removing the rack with the cooked cakes. The racks 4 are held in position by the catches 3, the end walls 12 of my device are preferably bent at an angle forming a stop for the shelves 9 and 10 on one side thus preventing either of said shelves from sliding out of said rack on to opposite side when hurriedly placed into position.

I do not wish to be limited to the specific construction herein set forth but wish to depart from such details as are within the scope of my invention.

By the use of my device the cakes are cooked quicker which tends to keep the grease from soaking in making the cakes more uniform, cheaper to manufacture and a more healthful food.

Having thus described my invention what I claim as new and desire to secure by Letters Patent of the United States is:

1. In a fry cake cooker, a rectangular kettle for fat, apertured supporting members secured in angular relation to said kettle, a rack, lower apertured fastening pieces secured to said rack, securing rods engaging said apertures in said supporting members and said fastening pieces when the rack is raised substantially out of the kettle whereby said rack is held in relatively an angular position to said kettle.

2. In a fry cake cooker, a rectangular kettle for fat, apertured supporting members secured in angular relation to said kettle, a rack, lower apertured fastening pieces secured to said rack, securing rods engaging said apertures in said supporting members and said fastening pieces when the rack is raised substantially out of the kettle whereby said rack is held in relatively an angular position to said kettle, upper apertured fastening pieces secured at an angle to said rack and adapted to receive said securing rod to prevent said rack from floating when lowered into said kettle.

In testimony whereof I have signed my name to this specification in the presence of two subscribing witnesses.

GUSTAV RUDOLF von KROGOLL.

Witnesses:
P. S. HURD,
H. E. TALBOT.

---

Copies of this patent may be obtained for five cents each, by addressing the "Commissioner of Patents, Washington, D. C."